United States Patent

[11] 3,597,540

[72] Inventor Ernest C. MacIntyre, Jr.
Woodridge, Ill.
[21] Appl. No. 811,809
[22] Filed Apr. 1, 1969
[45] Patented Aug. 3, 1971
[73] Assignee Motorola Inc.
Franklin Park, Ill.

[54] AUTOMATIC BRIGHTNESS CONTROL RESPONSIVE TO BLACK LEVEL OF VIDEO SIGNAL

7 Claims, 1 Drawing Fig.

[52] U.S. Cl. .......... 178/7.3 R, 178/7.5 R
[51] Int. Cl. .......... H04n 5/58
[50] Field of Search .......... 178/7.3 DC, 7.3 E, 7.5 DC, 7.5 E

[56] References Cited
UNITED STATES PATENTS
3,315,033 4/1967 Sennhenn et al. .......... 178/7.3 DC

*Primary Examiner*—Robert L. Griffin
*Assistant Examiner*—George G. Stellar
*Attorney*—Mueller and Aichele ABSTRACT: An automatic brightness control circuit in a color television receiver using direct demodulation of the color and brightness signals derives a brightness control voltage by comparing a reference signal, which is indicative of the cutoff or black-level condition of the cathode-ray tube, with the video signals supplied to the base of an NPN transistor output amplifier for the green output channel of the receiver. In one embodiment this is accomplished by the use of a differential clipper which is used to compare a reference voltage indicative of the desired black level with a voltage derived from the emitter of the green final amplifier stage during the scanning interval to provide pulses to an integrating circuit, the output of which is used to vary the DC operating level of the green, blue and red driver amplifiers in a closed-loop control system.

PATENTED AUG 3 1971 3,597,540
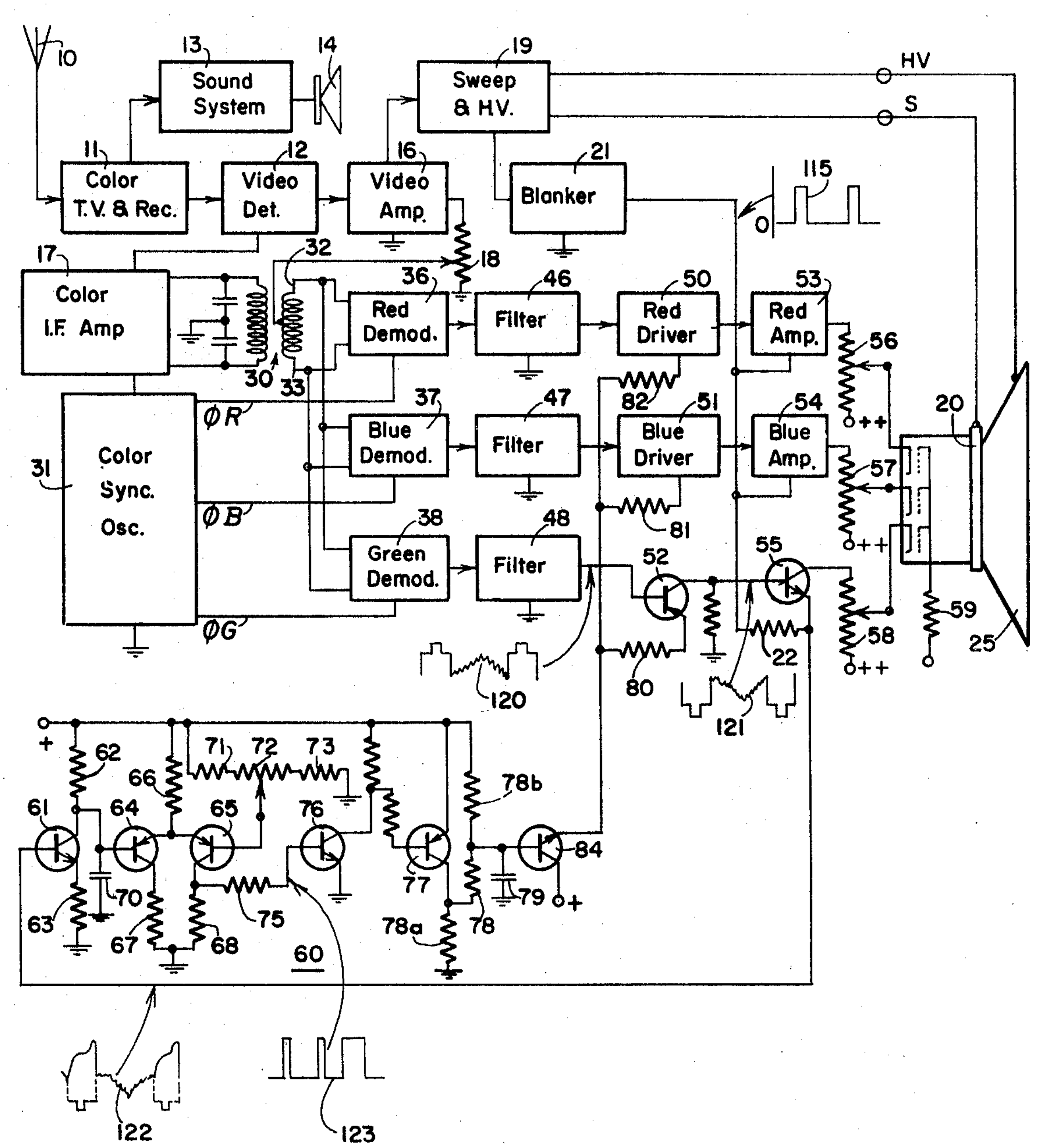
Inventor
ERNEST C. MACINTYRE, JR.
By Mueller, Aichele & Rauner
ATTYS.

AUTOMATIC BRIGHTNESS CONTROL RESPONSIVE TO BLACK LEVEL OF VIDEO SIGNAL

BACKGROUND OF THE INVENTION

In most black-and-white and color television sets there is provided a manual control for adjusting the contrast and brightness settings of the receiver. Automatic brightness control circuits operating during the retrace or blanking intervals and responsive to the synchronizing or blanking pulses for establishing the black level of the cathode-ray tube exist. Such systems however necessarily rely upon accurate black-level reference during these retrace or blanking intervals in order to provide correct black-level reproduction on the cathode-ray tube during the video or trace portion of the signals. Although theoretically the black level transmitted during the retrace portion of the signal is the correct black level, this is not always the case in practical applications of television systems. As a consequence, it is desirable to provide for an automatic brightness control circuit which operates during the video or trace portion of the signal to ascertain the black level of the video signal and to establish this level as the CRT cutoff or black level of operation.

SUMMARY OF THE INVENTION

Accordingly it is an object of this invention to provide an improved automatic brightness control circuit for a television receiver.

It is an additional object of this invention to operate an automatic brightness control circuit for a television receiver during the video or trace portion of the received television signal.

It is a further object of this invention to compare the black-going portions of a video signal during the trace interval with a reference to derive an automatic brightness control signal for a television receiver.

In a preferred embodiment of the invention, a reference voltage level, which is established to indicate the condition of operation of the cathode-ray tube for black level of brightness, is compared with a voltage representative of the video signal level during the scanning intervals to derive an output control voltage which is utilized to control the black level of the signals applied to the cathode-ray tube of the television receiver.

BRIEF DESCRIPTION OF THE DRAWING

The sole FIGURE of the drawing is a schematic circuit diagram, partially in block form, of a preferred embodiment of the invention.

DETAILED DESCRIPTION

Referring now to the drawing, there is shown a color television receiver 11 coupled to a suitable antenna 10 for receiving a composite television signal and for selecting, amplifying and converting the radiofrequency signal to IF frequency for application to a video detector 12. The color television receiver 11 also is coupled to a sound system 13 which demodulates and amplifies the usual 4.5 MHz. sound subcarrier for reproduction by a speaker 14, as the audio signals of the received composite signals supplied by the antenna 10 to the receiver 11.

The video detector 12 is coupled to a video amplifier 16 and a color IF amplifier 17, which are used to process the brightness and modulated chroma signal components of the received composite signals, respectively. The video amplifier 16 supplies signals to a sweep and high-voltage circuit 19 which has an output connected to the deflection yoke 20 located on the neck of a three-gun color cathode-ray tube 25. The sweep and high-voltage circuit 29 also provides a high-voltage for the screen of the shadow mask of the cathode-ray tube 25 in a conventional manner. In the color IF amplifier stage 17, there is a band-pass filter network for selecting the color subcarrier at 3.58 MHz. and its associated sidebands; and the amplifier 17 includes a gain or color intensity control to furnish a selected amplitude of the chroma subcarrier signal at opposite phases with respect to ground to the primary winding of an output transformer 30.

The IF amplifier 17 also is further coupled to a color-synchronizing oscillator 31 which selects the burst signals appearing on the "back porch" of the horizontal synchronizing pulses in order to develop a color reference signal of 3.58 MHz. at three different phases for synchronous demodulation of the chroma or color signals. The three outputs of the oscillator 31 are identified as $\theta$R, $\theta$B and $\theta$G to designate the phases of reference signals required for demodulating the red, blue and green colors of the modulated chroma signal components, respectively.

The output of the video amplifier 16 also is supplied through a contrast control potentiometer 18, the tap of which is connected to the center tap of the secondary winding of the transformer 30. The luminance or brightness signal obtained from the contrast potentiometer 18 may extend in frequency up to or into the chroma subcarrier sidebands.

The secondary winding of the transformer 30 has first and second output leads 32 and 33, with both of these leads carrying the same brightness component with respect to ground since this component is supplied to the center tap of the secondary winding of the transformer 30. The lead 32 carries the modulated chroma subcarrier of one phase, while the lead 33 caries the modulated chroma subcarrier of the opposite phase. These modulated chroma subcarrier signals are oppositely phased with respect to ground and are phasemodulated to represent hue and are amplitude modulated to represent saturation. The leads 32 and 33 each are coupled to three direct color signal demodulators 36, 37 and 38. In addition, the red, blue and green phase reference signals from the output of the color sync oscillator 31 are applied to the demodulators 36, 37 and 38, respectively, in order to provide direct demodulation of the signals applied to the inputs of these demodulators.

The outputs of the demodulators 36, 37 and 38 are supplied through associated filters 46, 47 and 48 which are provided to trap the 3,58 reference signal and pass the desired red, blue and green video output signals to three driver circuits 50, 51 and 52, respectively. Three amplifier circuits 53, 54 and 55 are driven by the outputs of the driver circuits and the outputs of the amplifier circuits are coupled through variable resistors 56, 57 and 58 to corresponding cathodes of the three-beam cathode-ray tube 25. Associated grids of these cathodes are coupled to a suitable bias source in common through a resistor 59, and the cathode-ray tube operates in accordance with well-known shadow-mask principles to reproduce a monochrome or full-color image in accordance with the video drive signals applied to it.

It is to be noted in conjunction with the foregoing description, that the red and blue drivers 50, 51 and amplifiers 53, 54 have been shown in block form, whereas the green driver 52 and green output amplifier 55 are shown as PNP and NPN transistors, respectively. The output taken from the emitter of the video amplifier 55 is supplied to one input of a closed-loop automatic brightness control circuit 60, the output of which then is supplied to the emitters of the transistors in the driver circuits 50, 51 and 52 through suitable coupling resistors 80, 81 and 82 to vary the DC voltage supplied to the driver transistors 50, 51, and 52. This in turn varies the black level or brightness of the signal applied by the amplifiers 53, 54 and 55 to the corresponding cathodes in the cathode-ray tube 25.

In the receiver generally described thus far, there may be additional circuitry which is known and which has not been disclosed in detail in order to simplify this disclosure. For example, there may be a gated automatic gain control system, a color-killer system for interrupting the amplifier 17 in the absence of the color signal, as well as other circuitry now known in commercially produced color television receivers. It should further be noted that it is preferable for the video detector 12 to be direct current coupled through all of the succeeding amplifiers and demodulators directly to the cathodes of the picture tube 25 in order to maintain the DC component of the signals processed in the various translation paths.

In order to simplify the operation of a television receiver to the greatest extent possible, it is desirable to provide for automatic operation of the set, including automatic adjustment of the contrast and brightness controls if possible. A suitable circuit which may be used to perform the function of automatic brightness control is shown in the circuit 60, which operates by monitoring the black-going signals obtained from the output of the green output amplifier 55 during the scan intervals of the received composite television signals, and utilizes the blackest-going portion of the signals obtained during the scan intervals as being the desired black level.

The brightness control circuit 60 includes a differential clipper consisting of a pair of PNP transistors 64 and 65 which are utilized as the black level sensing element. The transistor 65 is the reference transistor and has a reference biasing potential on its base obtained from a voltage divider connected across the B+ supply and consisting of a pair of resistors 71 and 73 connected in series with, and separated by, a potentiometer 72. The emitters of the transistors 64 and 65 are connected in common through an emitter-resistor 66 to the B+ supply and the collectors are connected through resistors 67 and 68, respectively, to ground.

The reference level established on the base of the transistor 65 constitutes an arbitrary black-sensing level for the receiver. In order to utilize this reference level as a control for the black signal level applied to the cathode-ray tube 25, a closed loop is used to adjust the DC potential applied to the emitters of the red, blue and green video drive amplifiers 50, 51 and 52 accordingly by comparing the blackest-going green video signal level with this preestablished reference level.

This is accomplished in the circuit 60 by supplying the output of the green video amplifier present on the emitter of the transistor 55 to the base of an NPN transistor inverter amplifier 61, which is connected to a source of positive potential through a collector resistor 62, with the emitter being connected to ground through an emitter resistor 63. The signals present on the collector of the transistor 61 are applied across a capacitor 70 to the base of the transistor 64 in the differential amplifier. The capacitor 70 is used to eliminate adverse effects of sharp black-going transients which occasionally occur in the signal.

Assume that a predetermined DC reference level, which is chosen by the viewer to be the black reference level, is set on the potentiometer 72, to provide a preestablished base bias for the transistor 65. It should be noted that the resistors 71 and 73 provide for the maximum and minimum settings of the brightness reference signal level which can be obtained by adjustment of the potentiometer 72. During the operation of the television receiver, a composite signal 120 is applied to the base of the green video driver transistor 52; and this signal is inverted by the transistor 52 to obtain the form of the signal 121 which is applied to the green amplifier transistor 55. In conjunction with this description it should be noted that during the trace interval, the output from a blanker circuit 21 supplied with input signals from the sweep and high-voltage circuit 19 is at ground potential and is applied to the emitter of the transistor 55 through a coupling resistor 22.

The signal on the emitter of the transistor 55 in the form of the composite signal 122, is applied to the base of the transistor 61 with the black-going portions of the signal tending to bias the base of the transistor 61 more negatively, thereby reducing its conductivity. This causes the potential on the collector of the transistor 61 to rise for black-going signals. On the other hand, for white-going signals, the transistor 61 is provided with a relatively positive biasing potential on its base rendering it more conductive, which in turn, causes the potential on its collector to drop or become more negative.

Whenever the voltage applied to the base of the transistor 64 becomes more positive than the reference potential applied to the base of the transistor 65, the PNP transistor 64 is cut off and the transistor 65 conducts, causing a relatively positive potential to be coupled through a coupling resistor 75 to the base of an NPN amplifier transistor 76 (see waveform 123). A positive output signal obtained from the collector of the transistor 65 renders the transistor 76 more conductive which in turn causes a PNP transistor 77 to be rendered more conductive, to cause the potential on its collector to rise to permit charging of a capacitor 79 through a resistor 78 to raise the potential on the base of an NPN emitter-follower transistor 84. This causes the transistor 84 to supply a more positive DC potential to the emitters of the red, blue and green driver transistors 50, 51 and 52 to raise the DC operating level thereof. This causes the black level or brightness of the television receiver to be changed accordingly by driving harder the amplifiers 53, 54 and 55 to increase the CRT beam current. The time constant of the integrating circuit of the capacitor 79 is chosen to extend over several frames to ensure that the peak black-going signal in the picture is used to control the brightness.

In the absence of black, the capacitor 79 is slowly discharged toward a potential established by a voltage divider including resistors 78, 78*a* and 78*b*, causing the transistor 84 to be rendered somewhat less conductive to lower the voltage on the emitters of the transistors 50, 51 and 52, which then causes these driver transistors to reduce the drive to the output transistors 53, 54 and 55, thereby decreasing the beam intensity or brightness. It should be noted that the control system just described continuously drifts toward black, and the brightness control circuit 60 is kicked back toward the white level by black-going signals. A resistor 78*b* in series with the resistors 78 and 78*a* provides the white-level limit to which the capacitor 79 can be charged.

During blanking intervals, a positive blanking pulse 115 is supplied to the emitter-resistor 22 of the green amplifier 55 and to similar resistors in the red and blue amplifiers 53 and 54 to cut off the output video amplifiers. This blanking pulse is of sufficient magnitude to override the signals which otherwise would appear on the emitter of the transistor 55 during the blanking interval and appears as white-going information at the base of the transistor 61 as can be ascertained by the solid-line portions of the waveform 122. As a consequence, the effect of the blanking pulse is relatively insignificant.

From the foregoing, it can be seen that the brightness control circuit 60 monitors the video signal between the blanking intervals and does not rely upon the signals present during the synchronizing and blanking intervals, as is commonly done in automatic brightness control circuits. As a consequence, the system chooses the most black-going video signal level as the black reference point and adjusts the brightness of the television receiver accordingly. The brightness control circuit 60 is rendered operative by the output of the green video amplifier 55 because the output of the green channel is most like the black-and-white signal.

It should be noted that if it were so desired, the brightness control circuit 60 could simultaneously monitor the outputs of all three output amplifiers 53, 54 and 55 by matrixing these outputs together in an OR-gate circuit. The blackest-going signal obtained from any of the three channels then would be utilized as the control signal. It has been found, however, that adequate brightness control for a color television receiver can be obtained by monitoring only the green channel, so that such a matrixing is not necessary. Of course, the automatic brightness control circuit shown also could be utilized in conjunction with a black-and-white receiver where it would monitor the output of the video channel in a manner comparable to the monitoring of the green channel shown in the drawing.

The automatic brightness control circuit, shown and described above and used in a DC coupled receiver, operates to adjust the black level of the television signal reproduced on the cathode-ray tube screen to the peak blackest-going portion of the received video signal during trace intervals and is independent of erroneous transmission of black-level signals during the blanking or synchronizing intervals of the transmitted signal. This automatic brightness control circuit is especially desirable in a television receiver also including an automatic contrast control circuit, so that it is unnecessary for the viewer to manually adjust the set to obtain the most desirable brightness and control settings.

I claim:

1. In a television receiver comprising a cathode-ray tube, a source of video signals including a range of brightness components extending from black to white during the trace intervals of operation of the cathode-ray tube, an improvement therein comprising an automatic brightness control circuit including in combination:

means for establishing a predetermined voltage reference level corresponding to the desired black level for said cathode-ray tube;

means responsive to the video signals during the trace intervals to provide a voltage representative of the level of the brightness components supplied by the receiver to the cathode-ray tube;

means for comparing the voltages of the reference voltage establishing means and the signal-responsive means to produce an output voltage indicative of the degree of correspondence of the voltage reference level and the brightness representative voltage; and integrating circuit means responsive to said output voltage for providing an output corresponding to the black level attained by the video signals to control the brightness level of the signals applied to the cathode-ray tube.

2. The combination according to claim 1 wherein the television receiver includes an output amplifier and a driver amplifier supplying signals to the output amplifier, with the means responsive to the video signal during the trace interval being responsive to signals obtained from the output amplifier and with the output of the integrating circuit means being connected with the input circuit of the driver amplifier for adjusting the operating level of the driver amplifier.

3. The combination according to claim 1 wherein the comparing means is a differential amplifier having two inputs, with one input of the differential amplifier being supplied with the voltage reference level obtained from the means for establishing a black voltage reference level and with the output voltage of the means responsive to the video signals during the trace interval being connected to the other input of the differential amplifier.

4. The combination according to claim 1 wherein the integrated circuit means operates to cause the level of the signals applied to the cathode-ray tube to drift black, and black-level signals sensed by the comparing means result in said output voltage causing the integrating circuit means to drive the level of the signals applied to the cathode-ray tube toward white.

5. The combination according to claim 1 wherein the comparing means is a differential amplifier having two inputs, one of which is supplied with said reference level voltage and the other input of which is supplied with the output of the means responsive to the video signal during the trace intervals, the output of the differential amplifier being supplied to the integrating circuit means.

The combination according to claim 5 wherein said television receiver includes an output amplifier and a driver amplifier supplying signals to the input of the output amplifier, with the output amplifier supplying signals to the cathode-ray tube and the means responsive to signals during the trace interval, and wherein the output of the integrating circuit means is supplied to the input circuit of the driver amplifier to vary the DC operating level thereof.

7. The combination according to claim 6 wherein the driver and output amplifiers are transistor amplifiers.